United States Patent
Feit et al.

(10) Patent No.: US 8,002,179 B2
(45) Date of Patent: Aug. 23, 2011

(54) HIDDEN CONSOLE DISPLAY

(75) Inventors: Steven Feit, Dublin, OH (US); Luis De Santos, Arlington, WA (US)

(73) Assignee: Honda Motor Co., Ltd., Tokyo (JP)

( * ) Notice: Subject to any disclaimer, the term of this patent is extended or adjusted under 35 U.S.C. 154(b) by 947 days.

(21) Appl. No.: 11/613,237

(22) Filed: Dec. 20, 2006
(Under 37 CFR 1.47)

(65) Prior Publication Data
US 2007/0138822 A1 Jun. 21, 2007

Related U.S. Application Data

(60) Provisional application No. 60/752,114, filed on Dec. 20, 2005.

(51) Int. Cl.
*G07B 15/02* (2011.01)
(52) U.S. Cl. .............. 235/382; 296/37.8; 296/37.12; 296/37.1; 340/482; 340/425.5
(58) Field of Classification Search ............ 235/384; 296/37.8, 37.12, 37.1; 340/472, 425.5
See application file for complete search history.

(56) References Cited

U.S. PATENT DOCUMENTS

| | | |
|---|---|---|
| 3,992,070 A | 11/1976 | Dunn et al. |
| 4,969,249 A | 11/1990 | Yamamoto et al. |
| 5,407,397 A * | 4/1995 | Foley ........................ 474/135 |
| 5,685,598 A | 11/1997 | Inoue et al. |
| D449,263 S | 10/2001 | Yamazaki et al. |
| 6,499,788 B2 | 12/2002 | Ito et al. |
| 6,502,888 B2 | 1/2003 | Inoue et al. |
| 6,503,098 B2 | 1/2003 | Aoki et al. |
| D470,809 S | 2/2003 | Asahi et al. |
| 6,575,583 B2 | 6/2003 | Suzuki et al. |
| 6,705,659 B2 | 3/2004 | Suzuki et al. |
| 6,767,041 B2 | 7/2004 | Shiono |
| D493,756 S | 8/2004 | Yamamoto et al. |
| 7,201,420 B2 * | 4/2007 | Vican ........................ 296/37.12 |
| 2003/0128103 A1 * | 7/2003 | Fitzpatrick et al. ........ 340/425.5 |
| 2005/0218706 A1 * | 10/2005 | Schikora .................... 297/217.4 |
| 2006/0108820 A1 * | 5/2006 | Vican ........................ 296/37.12 |
| 2006/0289190 A1 * | 12/2006 | Mok et al. ...................... 174/50 |
| 2007/0069544 A1 * | 3/2007 | Sturt et al. .................. 296/37.8 |
| 2009/0128307 A1 * | 5/2009 | Hentsch et al. ............ 340/425.5 |

* cited by examiner

*Primary Examiner* — Allyson N Trail
(74) *Attorney, Agent, or Firm* — Mark E. Duell, Esq.; Emerson Thomson Bennett (57) ABSTRACT

A display assembly is adapted to be received by a vehicle console and includes a chassis, a display member, a hood, and a mechanical positioning mechanism. The mechanical positioning mechanism can be easily activated to adjust the display member between a hidden or closed position and a visible or open position. In one embodiment, the display assembly has a latch mechanism to maintain the display member in the hidden position.

20 Claims, 11 Drawing Sheets

HIDDEN CONSOLE DISPLAY

This application claims priority to U.S. Ser. No. 60/752,114, entitled HIDDEN IN-DASH DISPLAY, filed Dec. 20, 2005, which is incorporated herein by reference.

I. BACKGROUND OF THE INVENTION

A. Field of Invention

This invention pertains to the art of methods and apparatuses for vehicle console displays, and more specifically to a console display assembly that uses a mechanical positioning mechanism to adjust a display member between a hidden position and a visible position.

B. Description of the Related Art

It is well known in the automotive industry to provide vehicle dashboards with some type of display component. Such display components are known as in-dash displays. The particular in-dash display may illustrate for the vehicle driver's viewing various data or other information such as data concerning the operation of the vehicle. The display may, for example, provide a series of gauges including a speedometer and a revolutions-per-minute (RPM) gauge. Additionally or alternatively, the display may include other monitoring devices such as an engine temperature gauge and/or oil pressure gauge. It is also know to provide environmental data such as the ambient temperature within the vehicle and/or outside of the vehicle. Still another subject for display may be a navigation system. Many other types of data may also be provided via the display.

Typically, the in-dash display is fixed in place with respect to the dashboard and thus is always visible. It is also known, however, to provide an in-dash display that can be adjusted between a visible position and a hidden position. Such known adjustable in-dash displays, however, require a motor to make the adjustment. This adds complexity and expense to the display. What is needed is a display using a simpler mechanical positioning mechanism to adjust the display member between a hidden position and a visible position.

II. SUMMARY OF THE INVENTION

According to one aspect of this invention, a display assembly that is adapted to be received by a vehicle console includes a chassis, a display member, a hood and a mechanical positioning mechanism. The mechanical positioning mechanism can be used to selectively adjust the display member into a hidden position and to selectively adjust the display member into a visible position.

According to another aspect of the invention, the display assembly may include a latch mechanism to maintain the display member in the hidden position and a locking mechanism to maintain the display member in the visible position.

According to another aspect of the invention, activation of the mechanical positioning mechanism to adjust the display member from the hidden position into the visible position may include pivoting the hood in a first direction and pivoting the display member in a second direction.

One advantage of this invention is that the display assembly is easy to operate and provides a low-profile console display that can be adjusted into hidden and visible positions.

Another advantage of this invention is that the display assembly can be easily and economically constructed and installed.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
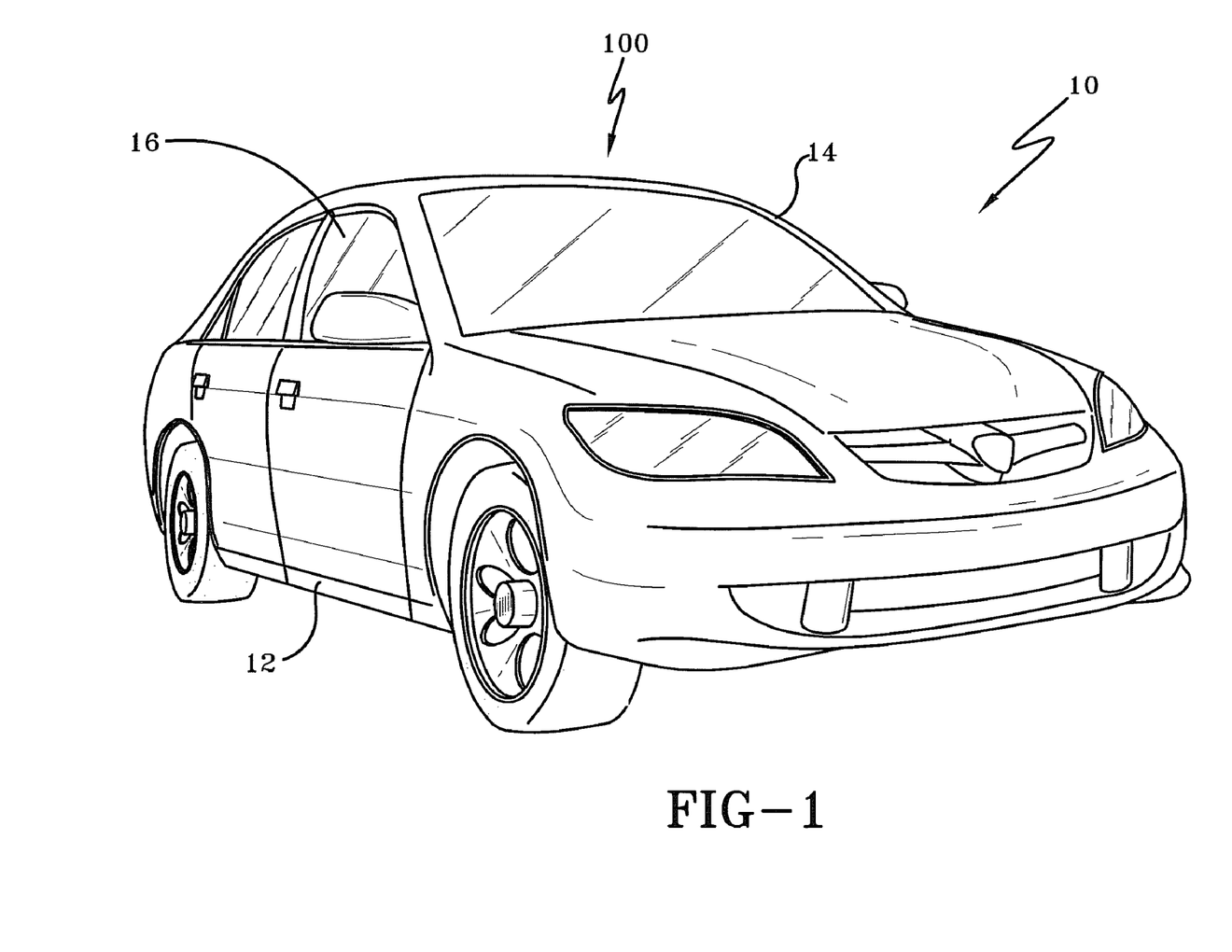
FIG. 1 is a perspective front view of a vehicle equipped with a display assembly according to this invention.
Figure 2:
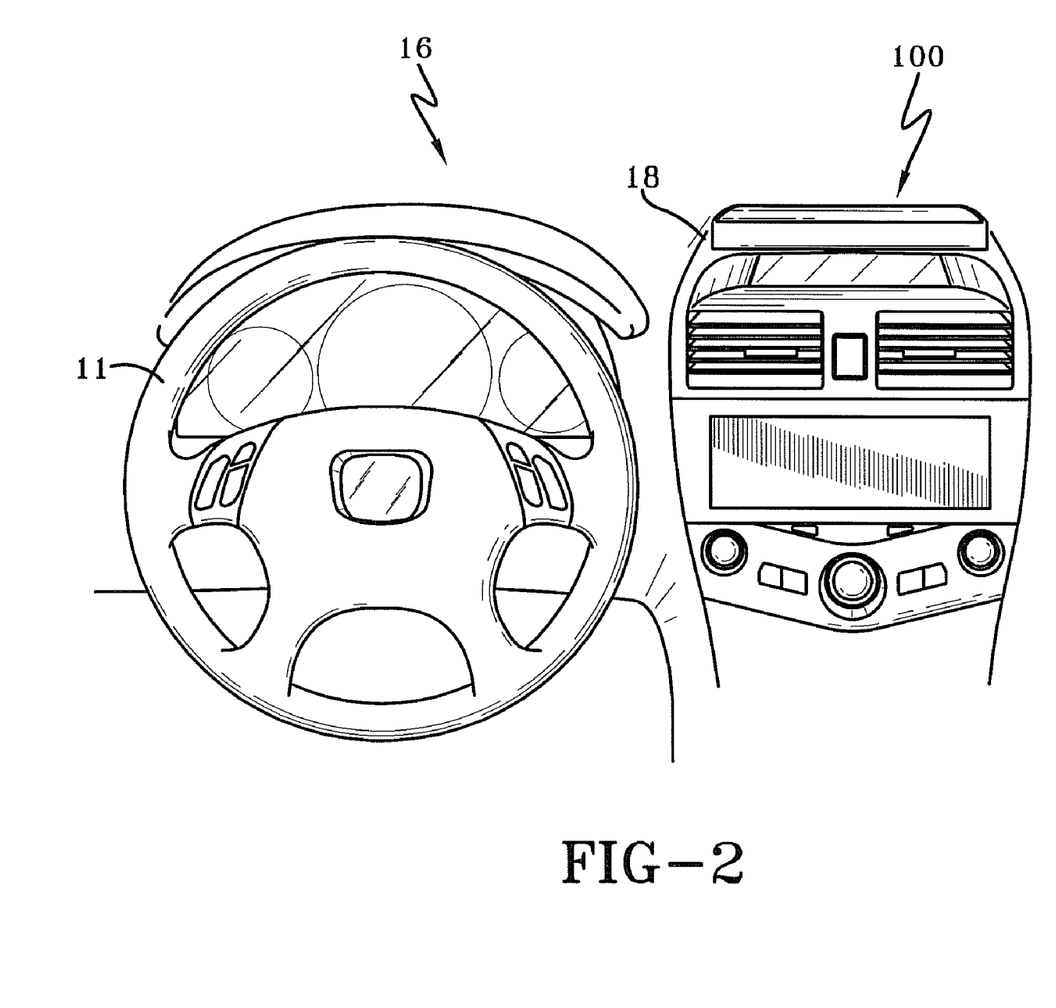
FIG. 2 is a close up back view of a portion of the passenger compartment of the vehicle shown in FIG. 1 showing the display assembly received by the console.

Referring now to the drawings wherein the showings are for purposes of illustrating embodiments of the invention only and not for purposes of limiting the same, FIGS. 1 and 2 shows a vehicle 10 equipped with a display assembly 100 according to this invention. It should be noted that while an automotive passenger vehicle 10 is shown, the inventive display assembly 100 will work well with other vehicles and for other purposes as well. The vehicle 10 may include a vehicle frame 12 and a body 14 that is supported on the frame 12. The body 14 defines a passenger compartment 16 which is equipped to receive one or more passengers as is well known in the art. The vehicle 10 also may include all the conventional components of a vehicle 10 that are well known in the art including a steering wheel 11 and a console 18 which is supported on the vehicle frame 12 in any conventional manner. It should be noted that while the console 18 shown is positioned in front of the steering wheel 11 on the portion of the vehicle 10 commonly referred to as a dashboard, the display assembly 100 of this invention will work well with a console positioned anywhere within the passenger compartment 16 including, for non-limiting examples, between front seats and between back seats. A non-limiting list of components that may be included with the vehicle 10 are described in U.S. Pat. No. 6,763,660 titled EXHAUST STRUCTURE IN ENGINE FOR AUTOMOBILE which has a common assignee and which is incorporated herein by reference. The display assembly 100 may be received by the console 18. The expression "received by the console" is meant to include positioning the display assembly 100 within the console, on top of the console (as shown), mounted on the side of the console, mounted below the console or in any other way operatively connected to the console 18.

With reference now to FIGS. 2-5, the display assembly 100 may include a chassis or body portion 110, a display member 120, a hood 130 and a mechanical positioning mechanism 150. The display member 120 is the device that illustrates or otherwise communicates data or other information for the operator (usually the vehicle driver but other passengers in the passenger compartment 16 of the vehicle 10 may also be operators) to ascertain. The particular data or information that is provided by the display member 120 of this invention can be any data or information that can be provided by the particular display member 120. Examples of such data include conventionally provided data including vehicle speed, engine speed, engine oil pressure, engine temperature, fuel tank level, and the like. Other examples include time data such as provided by a clock and environmental data such as the ambient temperature within the vehicle and/or outside of the vehicle. Still another example is a navigation system. A non-limiting list of other possible data or information that may be provided by the display member 120 is provided in U.S. Pat. No. 6,575,583 titled DISPLAY DEVICE FOR VEHICLES which has a common assignee and which is incorporated herein by reference.

Figure 8:
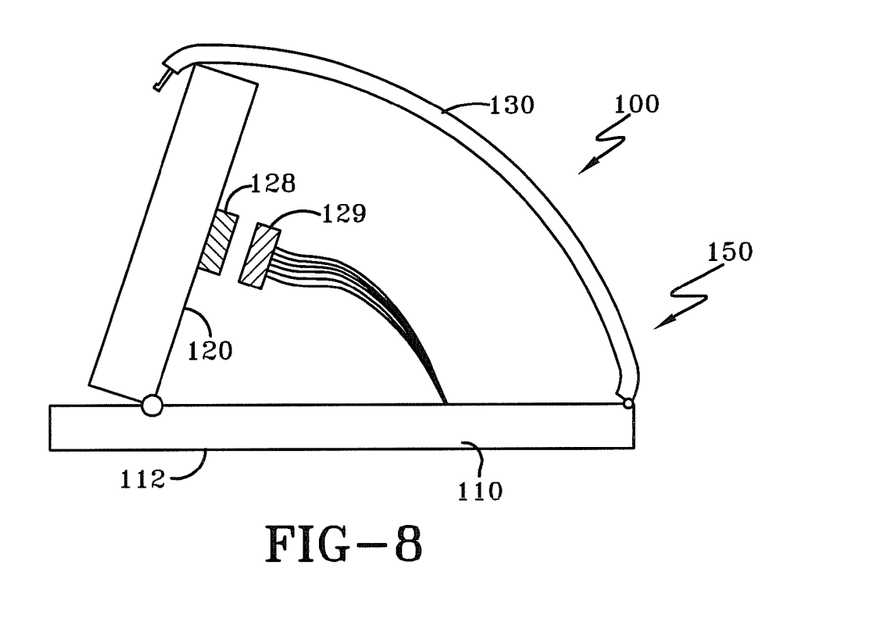
FIG. 8 is a side view schematic representation of the display assembly of FIG. 6 but shown in the visible or open position.

With continuing reference to FIGS. 2-5, while the particular display member design can be any chosen with sound engineering judgment, the display member 120 shown includes a display screen 122, an operator control panel 124 and a body 117 which houses the display screen 122, the control panel 124 and all the necessary electric circuitry to operate the control panel 124 and the display screen 122. In one embodiment, the electric circuitry includes at least one control Printed Circuit Board (PCB). As schematically shown in FIG. 8, a connector 128 is provided to connect the electric circuitry of the display member 120 to the vehicle electric harness 129 which provides power and information to the display member 120. The control panel 124 may include switches, buttons, knobs, hardkeys, softkeys or any other type of interface devices 126 chosen with sound engineering judgment that permit the operator to interface with the display member 120. Alternatively or in addition, the display screen 122 may be a touch screen. In another embodiment, the display screen 122 may be provided without any interface devices. It should be noted that while a display screen 122 is provided in the illustrated embodiment, in place or in addition to the display screen 122, the display member 120 may include one or more audio devices to provide audio output to the operator.

With reference now to FIGS. 3-8, the mechanical positioning mechanism 150 can be used to adjust the display member 120 from a hidden or closed position (shown in FIGS. 3 and 6) to a visible or open position (shown in FIGS. 4, 5 and 8) and to adjust the display member 120 from the visible position to the hidden position. The mechanical positioning mechanism 150 of this invention is simple to operate and does not require a motor as does known in-dash displays. The mechanical positioning mechanism 150 may work with the chassis 110 and hood 130 as will now be described. The chassis 110 may include a bottom 112 with generally vertically upward extending sides 114 that define a chassis compartment 116 that receives the display member 120. The hood 130 may include a top 132 and a pair of flaps 134 that extend generally vertically downward from two ends of the top 132, as shown. A front portion of the display member 120 may be pivotable about a pivot member 119 that is attached to the chassis 110. The pivot member 119, which defines a pivot axis, may be a pin or other pivot member chosen with sound engineering judgment. Though not required, a second pivot member, not shown, may be positioned at the opposite side of the display assembly 100 and may also be used in pivoting the display member 120 about the chassis 110.

With reference now to FIGS. 3-8 and 13, to assist with the relative motion of the chassis 110, the hood 130 and the display member 120, a pair of extension members 118, 118 may extend from opposite sides of the display member 120 and may be received within a pair of slots 133, 133 formed in the flaps 134, 134. The slots 133, 133 may be curvilinear in shape, as shown. With this arrangement, lifting of the hood 130 causes the display member 120 to also lift and lowering of the hood 130 causes the display member 120 to lower. It should be understood that a single extension member 118 received in a single slot 133 will also work with this invention. Each extension member 118 may be a pin or other member chosen with sound engineering judgment.

With reference now to FIGS. 3-8 and 10-12, the hood 130 may be connected to, and pivotable about, the chassis 110 with a screw 121, bushing 123 arrangement, as shown. The screw 121 bushing 123 design, which defines a pivot axis, may alternatively be formed in any manner chosen with sound engineering judgment. A gear 125, rotatable about its axis, may be positioned on an outer surface of one of the flaps 134, as shown. The gear 125 may have a plurality of teeth 127 that engage the spaces of a rack 131 that extends from an inner surface of the chassis 110 in a known manner. Optionally, a guide pin 141 may extend from an outer surface of one of the flaps 134 and be received within a groove 143 formed in the surface of the chassis 110, as shown. The use of both the gear 125/rack 131 engagement and the guide pin 141/groove 143 engagement provides a very smooth operation as the hood 130 is raised and lowered. A damping mechanism 145 may be provided to dampen or slow the relative motion of the hood 130 with respect to the chassis 110 and thus the motion of the display member 120 with respect to the chassis 110. While the damping mechanism 145 can be of any design chosen with sound engineering judgment, for the embodiment shown, a shaft 200 is fixed to and extends from the gear 125 as shown. A cover member 202 has a hole 204 and at least one clip 206, two clips shown. The clips 206, 206 are received within an opening 208 in a base member 210 and then expand slightly outwardly to create a connection with the outer ring of the base member 210. A friction plate 212 having a slot 214 and a friction surface 216 is positioned between the cover member 202 and the base member 210. The end of the shaft 200 may be of a non-cylindrical shape corresponding to (and received within) the slot 214 in the friction plate 212, as shown. For this reason, rotation of the gear 125 causes rotation of the shaft 200 and of the friction plate 212. This rotation, however, causes the friction surface 216 to contact and rub against an inner surface of the cover member 202. This frictional contact dampens the rotation of the gear 125 and, as a result, also dampens the relative motion of the hood 130 with respect to the chassis 110 and the motion of the display member 120 with respect to the chassis 110.

Figure 9:
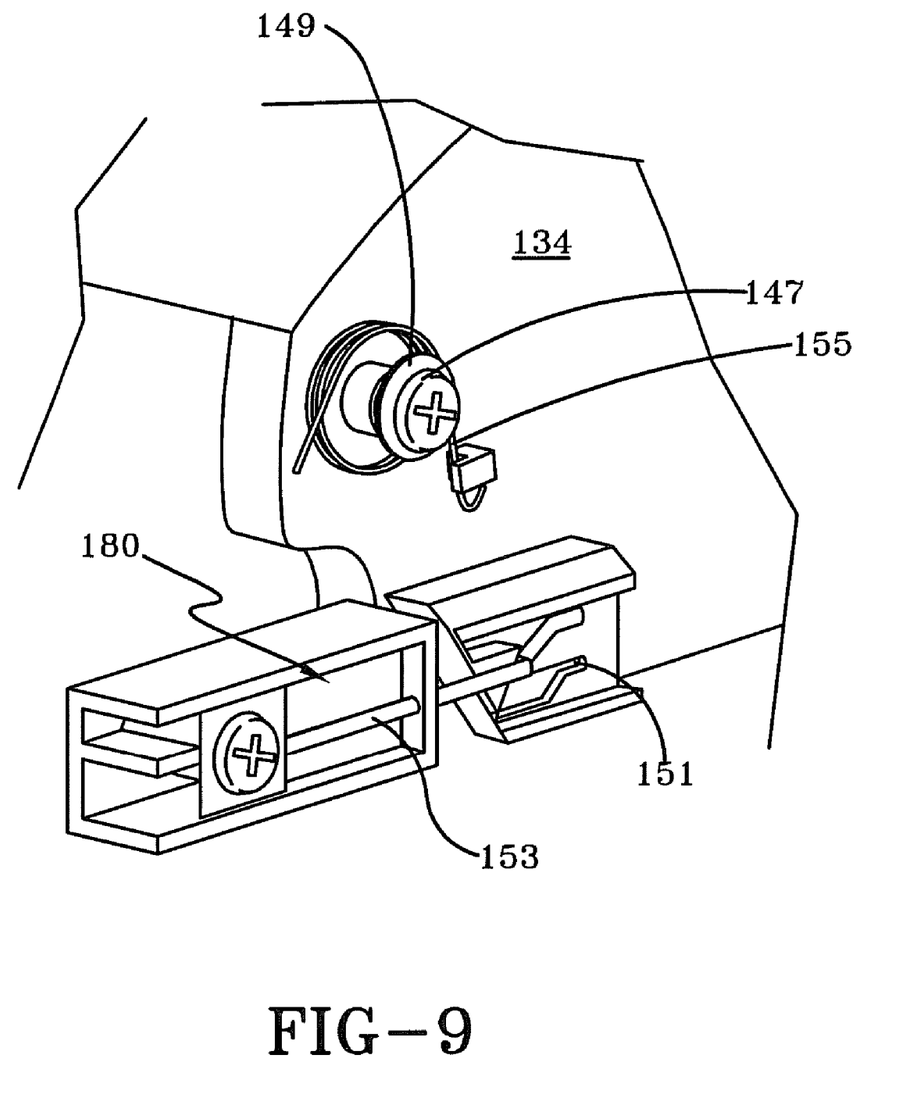
FIG. 9 is a detailed internal schematic view of section A-A from FIG. 4 illustrating the latch mechanism.
Figure 10:
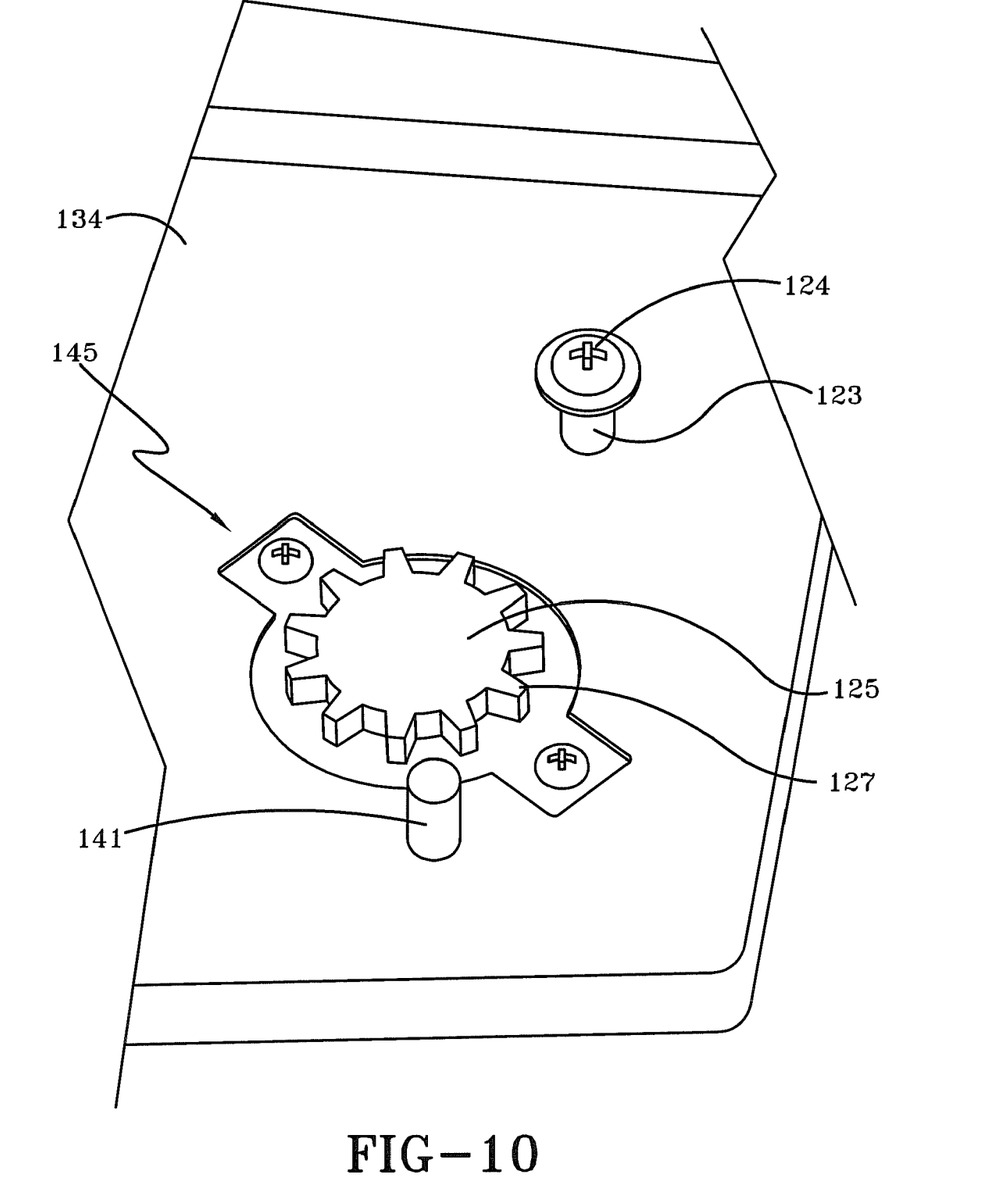
FIG. 10 is a first detailed internal schematic view of section B-B from FIG. 5 illustrating the gear and guide pin.
Figure 11:
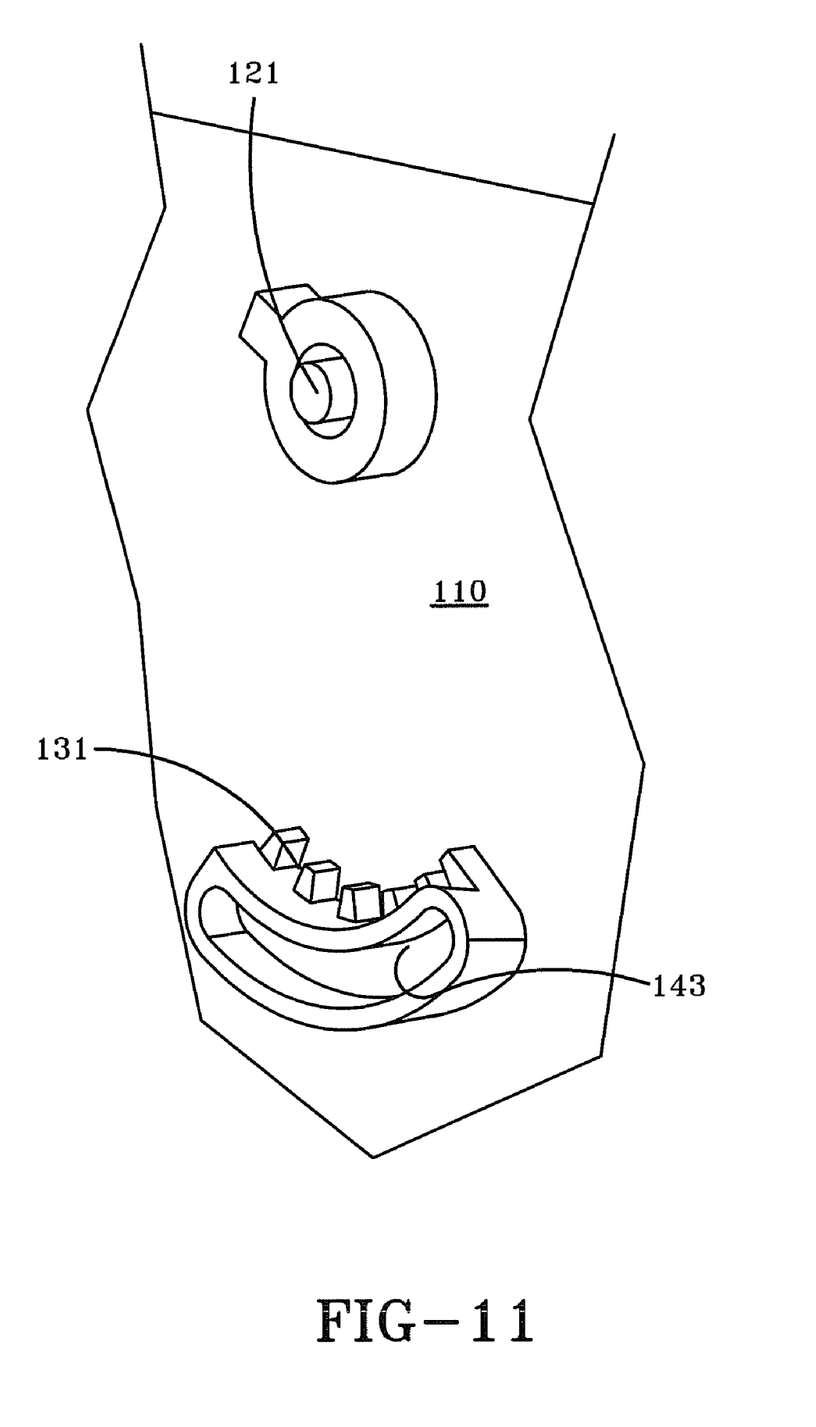
FIG. 11 is a second detailed internal schematic view of section B-B from FIG. 5 illustrating the rack and slot.
Figure 12:
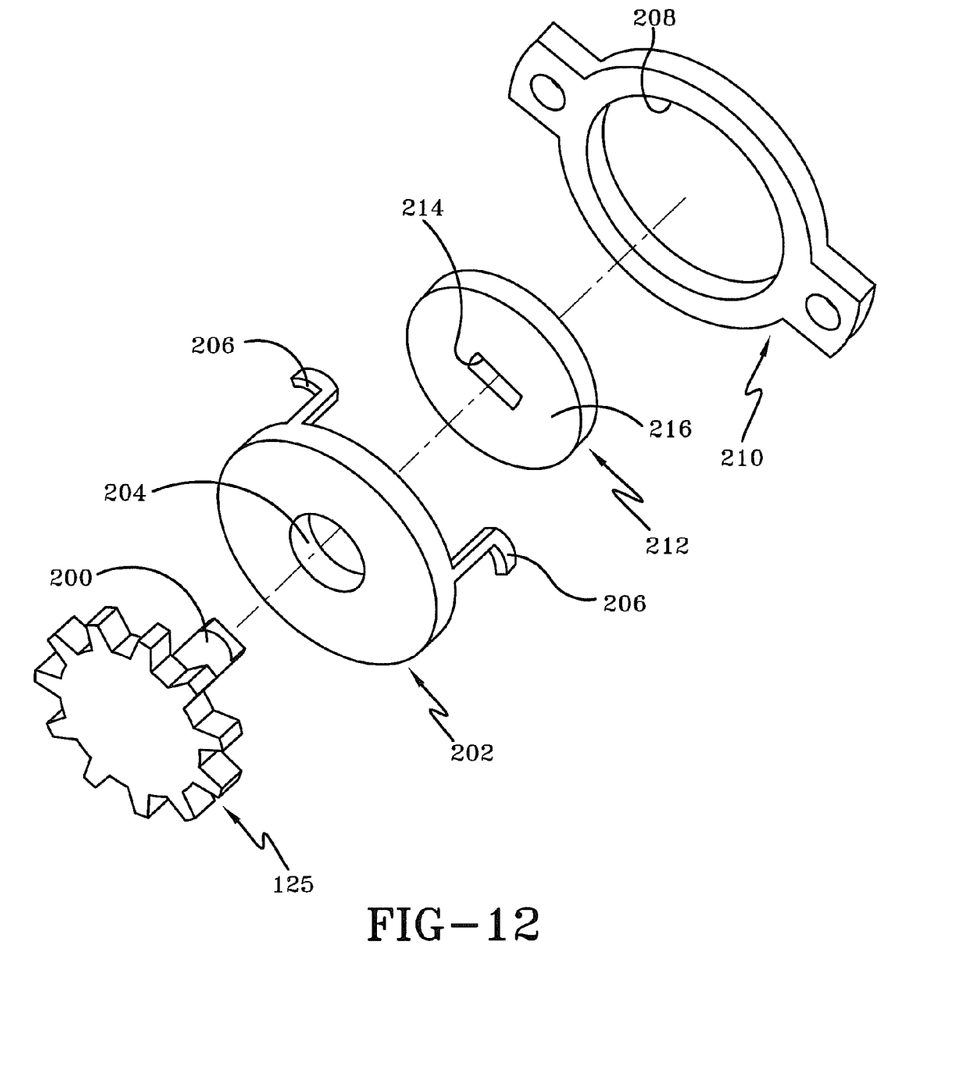
FIG. 12 is a third view of section B-B from FIG. 5 showing an assembly that may be used to dampen the relative motion of the hood with respect to the chassis and the relative motion of the display member with respect to the chassis.
Figure 13:
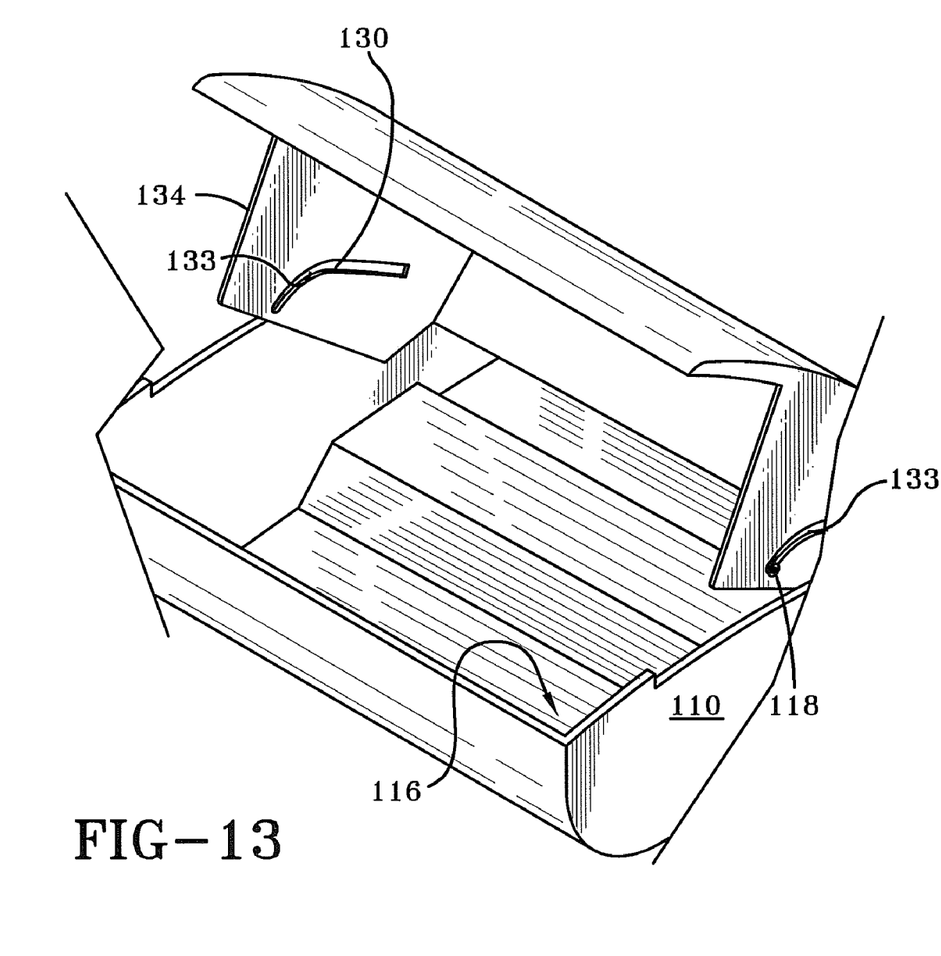
FIG. 13 is a perspective right end view of the display assembly similar to that shown in FIG. 5 but with the display member removed to show assembly details.

With reference now to FIGS. 3-8 and especially FIG. 9, in one embodiment the mechanical positioning mechanism 150 includes a latch mechanism 180 to selectively maintain the display member 120 in the hidden or closed position. The latch mechanism 180 may include a screw 147, bushing 149 arrangement similar to the screw/busing arrangement described above. A latch plate 151 may be positioned on an outer surface of one of the flaps 134 as shown. The latch plate 151 selectively engages a set pin 153 positioned on an inner surface of the chassis 110 in a known manner. A tension spring 155 may be positioned around the screw 147 and bushing 149 and provide a force tending to move the display member 120 into the visible or open position.

Figure 3:
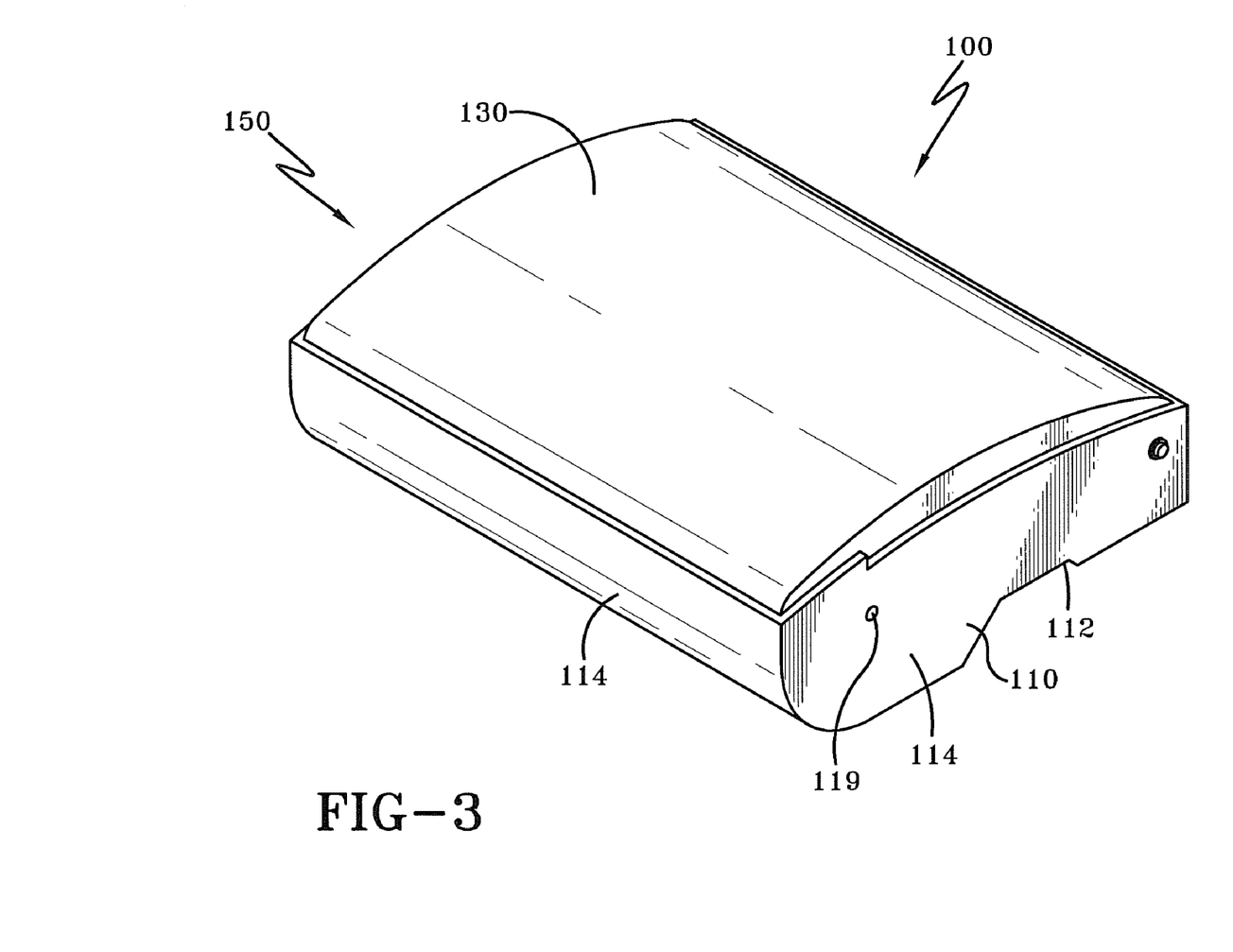
FIG. 3 is a perspective right end view of the display assembly in the hidden or closed position.
Figure 4:
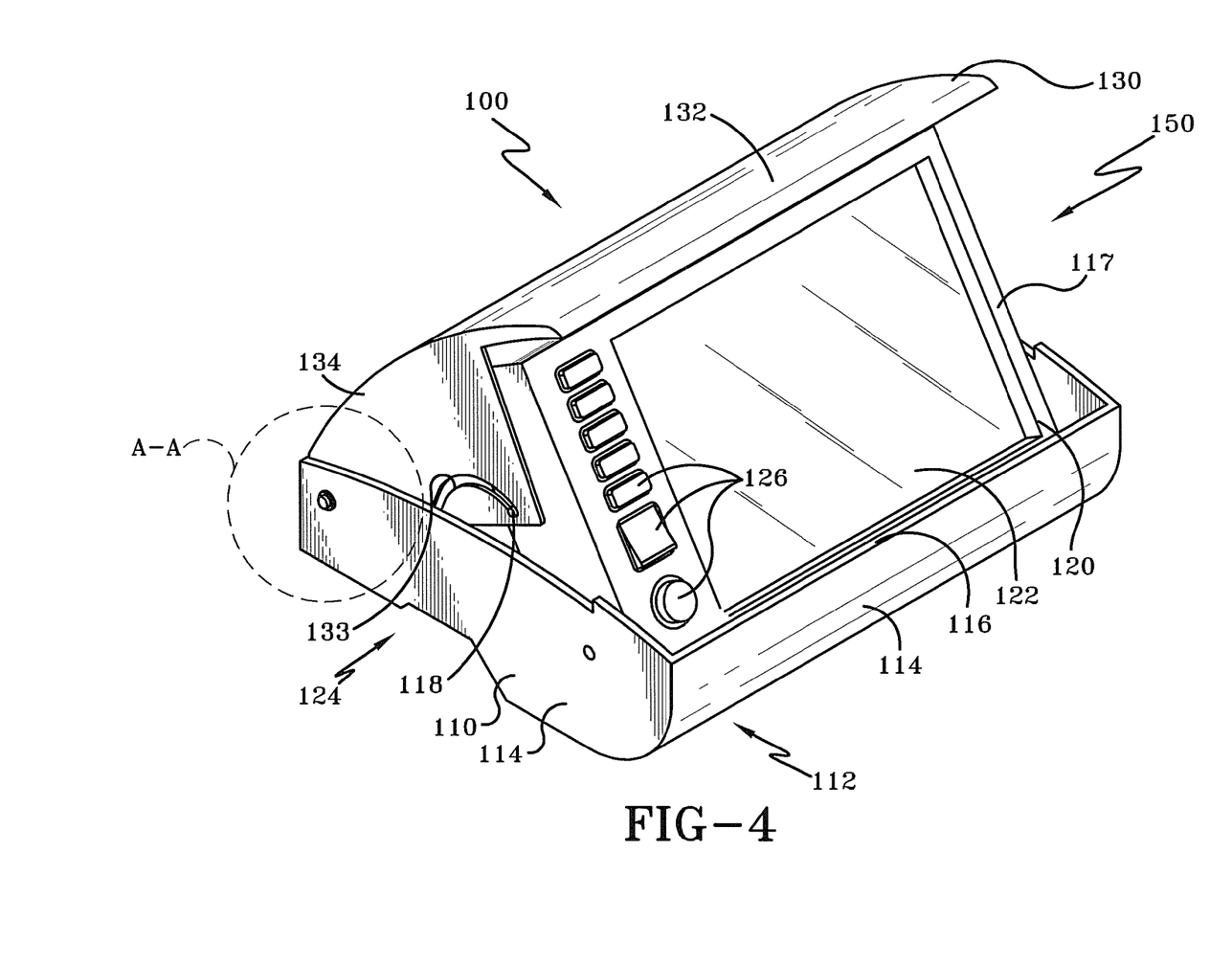
FIG. 4 is a perspective left end view of the display assembly of FIG. 3 shown in the visible or open position.
Figure 5:
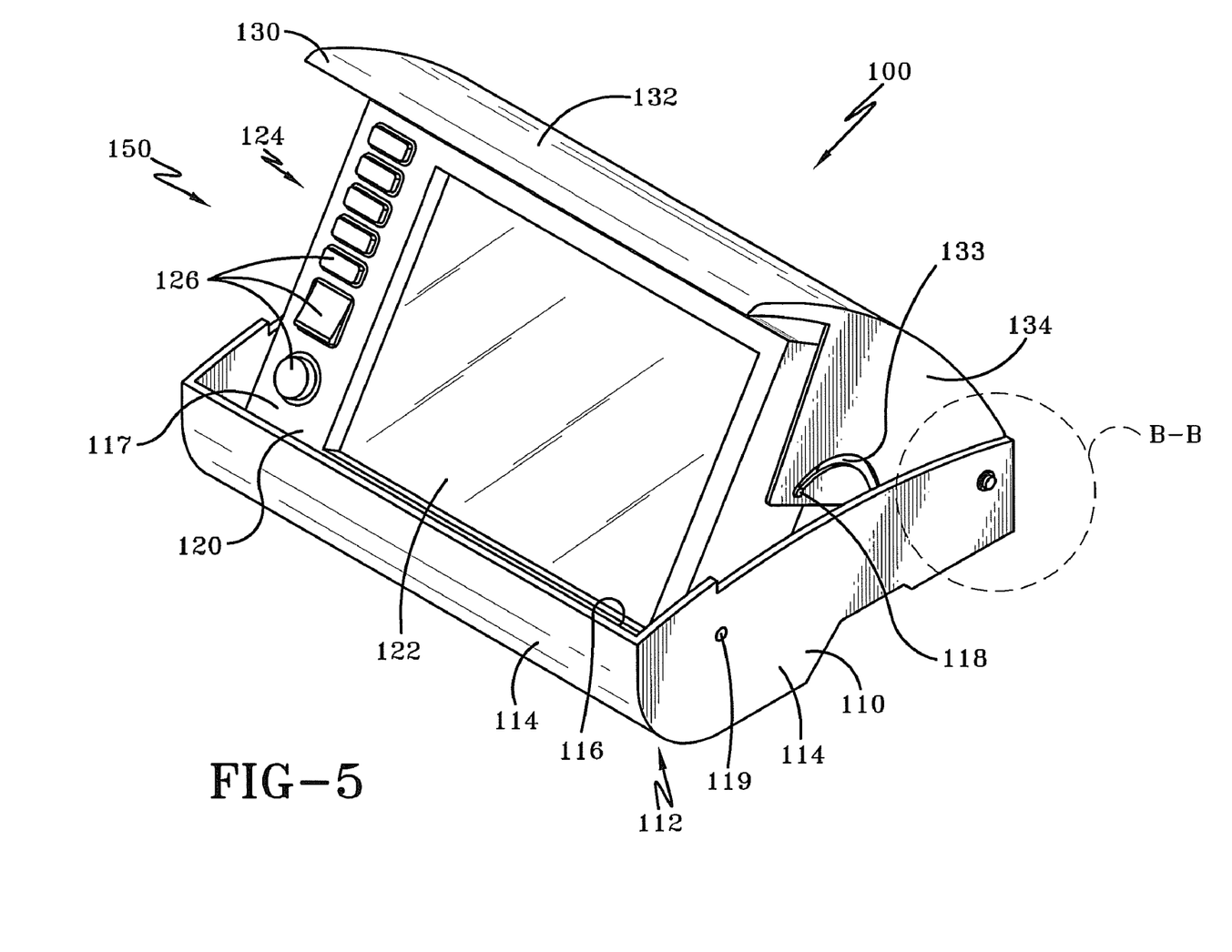
FIG. 5 is a perspective right end view of the display assembly of FIG. 4.
Figure 6:
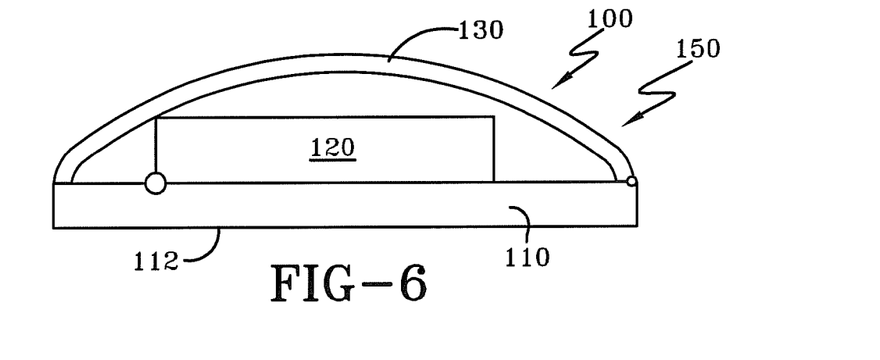
FIG. 6 is a side view schematic representation showing the display assembly in the hidden or closed position.
Figure 7:
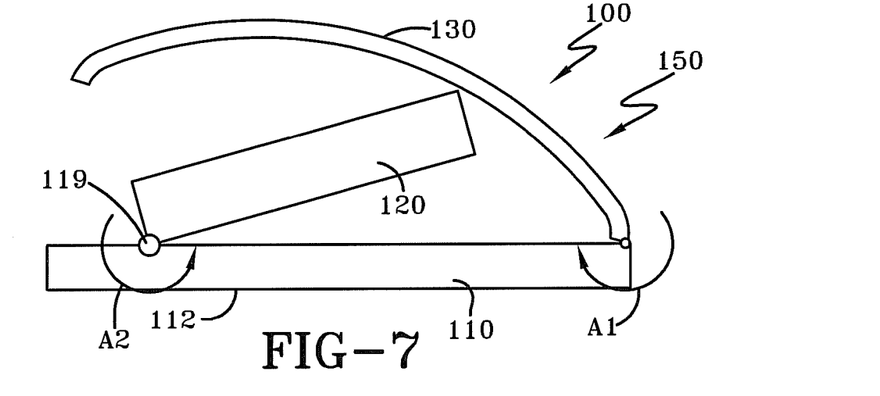
FIG. 7 is a side view schematic representation of the display assembly of FIG. 6 but shown in the process of being opened.

With reference now to FIGS. 2-13, the operation of the display assembly 100 will now be described. To activate the mechanical positioning mechanism 150 to adjust the display member 120 from a hidden or closed position (as shown in FIGS. 3 and 6) into a visible or open position (as shown in FIGS. 4, 5 and 8), the operator simply depresses on the top 132 of the hood 130 and then releases the hood 130. This motion releases the latch mechanism 180 by disengaging the set pin 153 from the latch plate 151. With the latch mechanism unlatched, the tension spring 155 causes the hood 130 to pivot in a clockwise direction A1 (as shown in FIG. 7) and the display member 120 to pivot in a counterclockwise direction A2. This motion is smooth due to the damping mechanism 145 described above. As the hood 130 pivots about the screw 121/bushing 123 arrangement, the display member 120 extension members 118, 118 slide within the chassis 110 slots 133, 133. Next, it is only necessary, if required, for the operator to manipulate one or more interface devices 126 in order to display the desired data on the display member 120. It should be noted that in one embodiment the display member 120 can automatically display predetermined data without the need for the operator to manipulate any interface device.

With continuing reference to FIGS. 2-13, to activate the mechanical positioning mechanism 150 to adjust the display member 120 from the visible or open position (as shown in FIGS. 4, 5 and 8) to the hidden or closed position (as shown in FIGS. 3 and 6), the operator simply depresses on the top 132 of the hood 130 until the latch mechanism 180 engages. The operator can then release the hood 130. This motion overcomes the biasing force of the tension spring 155 and permits the hood 130 to pivot in a counterclockwise direction (as shown in FIG. 7) and simultaneously permits the display member 120 to pivot in a clockwise direction.

Various embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. A display assembly adapted to be received by a vehicle console, comprising:
    a chassis;
    a display member operatively connected to an electric harness of an associated vehicle, which provides electrical power and information to electrical circuitry of the display member;
    a hood; and,
    a mechanical positioning mechanism for use in selectively adjusting the display member into a hidden position and for use in selectively adjusting the display member into a visible position;
    wherein the display member is in a substantially horizontal orientation in the hidden position, and the hood covers substantially the entire display member in the hidden position; and
    wherein the display member is in a substantially non-horizontal orientation in the visible position.

2. The display assembly of claim 1 wherein the mechanical positioning mechanism further comprises:
    a latch mechanism to selectively maintain the display member in the hidden position.

3. The display assembly of claim 1 wherein the mechanical positioning mechanism further comprises:
    a damping mechanism to dampen the relative motion of the hood with respect to the chassis and the motion of the display member with respect to the chassis when the display member adjusts from a hidden position into a visible position.

4. The display assembly of claim 3 wherein the damping mechanism comprises:
    a friction plate that receives a shaft.

5. The display assembly of claim 1 further comprising:
    a first pivot member operatively attached to the chassis about which the hood can pivot.

6. The display assembly of claim 5 further comprising:
    a second pivot member operatively attached to the chassis about which the display member can pivot.

7. The display assembly of claim 5 further comprising:
    a gear having a plurality of teeth positioned on an outer surface of the hood; and,
    a rack that engages the teeth and that is positioned on an inner surface of the chassis.

8. The display assembly of claim 1 wherein a first extension member extends from the display member and is received within a slot in the hood.

9. A vehicle comprising:
    a vehicle frame;
    a console supported on the vehicle frame; and,
    a display assembly received by the console, the display assembly comprising:
        (A) a chassis;
        (B) a display member operatively connected to an electric harness of the vehicle, which provides electrical power and information to electrical circuitry of the display member;
        (C) a hood; and,
        (D) a mechanical positioning mechanism for use in selectively adjusting the display member into a hidden position and for use in selectively adjusting the display member into a visible position;
        wherein the display member is in a substantially horizontal orientation in the hidden position, and the hood covers substantially the entire display member in the hidden position; and
        wherein the display member is in a substantially non-horizontal orientation in the visible position.

10. The vehicle of claim 9 wherein the display assembly further comprises:
    a latch mechanism to selectively maintain the display member in the hidden position;
    a first pivot member operatively attached to the chassis about which the hood can pivot; and,
    a second pivot member operatively attached to the chassis about which the display member can pivot;
    wherein the hood pivots in a first direction and the display member pivots substantially simultaneously in a second direction;

wherein the second direction is substantially different from the first direction.

11. A method comprising the steps of:
provadiing a vehicle having a vehicle frame and a console supported on the vehicle frame;
providing a display assembly received by the console, the display assembly comprising:
(A) a chassis;
(B) a display member operatively connected to an electric harness of the vehicle, which provides electrical power and information to electrical circuitry of the display member;
(C) a hood; and,
(D) a mechanical positioning mechanism;
activating the mechanical positioning mechanism to adjust the display member from a hidden position into a visible position;
wherein the display member is in a substantially horizontal orientation in the hidden position, and the hood covers substantially the entire display member in the hidden position; and
wherein the display member is in a substantially non-horizontal orientation in the visible position.

12. The method of claim 11 wherein the step of, activating the mechanical positioning mechanism to adjust the display member from a hidden position into a visible position, comprises the steps of:
pivoting the hood in a first direction; and,
substantially simultaneously pivoting the display member in a second direction;
wherein the second direction is substantially different from the first direction.

13. The method of claim 12 wherein:
the step of, pivoting the hood in a first direction, comprises the step of pivoting the hood about a pivot axis on the chassis; and,
the step of, pivoting the display member in a second direction, comprises the step of pivoting the display member about a pivot axis on the chassis.

14. The method of claim 11 wherein the step of, activating the mechanical positioning mechanism to adjust the display member from a hidden position into a visible position, comprises the step of:
sliding an extension member within a slot.

15. The method of claim 14 wherein the step of, sliding an extension member within a slot, comprises the step of:
sliding a first extension member attached to the display member within a first slot formed in the hood.

16. The method of claim 15 wherein after the step of, sliding an extension member attached within the slot, comprises the step of:
sliding a second extension member attached to the display member within a second slot formed in the hood.

17. The method of claim 11 wherein the step of, activating the mechanical positioning mechanism to adjust the display member from a hidden position into a visible position, comprises the step of:
unlatching the hood from the chassis.

18. The method of claim 11 wherein the step of, activating the mechanical positioning mechanism to adjust the display member from a hidden position into a visible position, comprises the step of:
damping the relative motion of the hood with respect to the chassis and the motion of the display member with respect to the chassis.

19. The method of claim 11 wherein after the step of, activating the mechanical positioning mechanism to adjust the display member from a hidden position into a visible position, the method comprises the step of:
activating the mechanical positioning mechanism to adjust the display member from the visible position into the hidden position.

20. The method of claim 11 wherein the step of, activating the mechanical positioning mechanism to adjust the display member from a hidden position into a visible position, comprises the step of:
rotating a gear within a rack.

* * * * *